US012006190B2

(12) United States Patent
Struck et al.

(10) Patent No.: US 12,006,190 B2
(45) Date of Patent: Jun. 11, 2024

(54) LIFTING GEAR

(71) Applicant: COLUMBUS MCKINNON INDUSTRIAL PRODUCTS GMBH, Wuppertal (DE)

(72) Inventors: Detlef Struck, Wuppertal (DE); Wolfram Schneebeck, Wuppertal (DE)

(73) Assignee: COLUMBUS MCKINNON INDUSTRIAL PRODUCTS GMBH, Wuppertal (DE)

( * ) Notice: Subject to any disclaimer, the term of this patent is extended or adjusted under 35 U.S.C. 154(b) by 0 days.

(21) Appl. No.: 17/629,083

(22) PCT Filed: Feb. 13, 2020

(86) PCT No.: PCT/DE2020/100101
§ 371 (c)(1),
(2) Date: Jan. 21, 2022

(87) PCT Pub. No.: WO2021/013286
PCT Pub. Date: Jan. 28, 2021

(65) Prior Publication Data
US 2022/0242704 A1 Aug. 4, 2022

(30) Foreign Application Priority Data
Jul. 24, 2019 (DE) ..................... 10 2019 120 036.9

(51) Int. Cl.
*B66D 1/06* (2006.01)
*B66D 3/14* (2006.01)
(Continued)

(52) U.S. Cl.
CPC ................. *B66D 1/06* (2013.01); *B66D 3/14* (2013.01); *B66D 5/14* (2013.01); *B66D 5/34* (2013.01); *B66D 2700/05* (2013.01)

(58) Field of Classification Search
CPC ... B66D 1/04; B66D 1/06; B66D 1/14; B66D 1/16; B66D 1/20; B66D 1/28; B66D 1/30;
(Continued)

(56) References Cited

U.S. PATENT DOCUMENTS 3,276,553 A * 10/1966 Tilloy ..................... F16D 49/08 192/69.62
4,058,271 A * 11/1977 Ubukata ............... B60R 22/405 242/383.4
(Continued)

FOREIGN PATENT DOCUMENTS

CN 201485220 U 5/2010
CN 205023789 U 2/2016
(Continued)

OTHER PUBLICATIONS

Office Action for Japanese Application No. 2022-503927 dated Jan. 30, 2023; 4pp.
(Continued)

*Primary Examiner* — Michael R Mansen
*Assistant Examiner* — Henrix Soto
(74) *Attorney, Agent, or Firm* — HAUPTMAN HAM, LLP

(57) ABSTRACT

A lever hoist includes a housing in which a load chain wheel and a drive shaft driving the load chain wheel via a transmission are rotatably mounted, as well as a safety brake. A load chain is movable via the load chain wheel. The safety brake implements emergency braking in response to excessive rotational speed of the drive shaft. The safety brake includes a locking disc with teeth and a control disc with control cams. The locking disc and the control disc are rotatable in a limited manner. A catch hook is movable in a swiveling manner and has a latch contour at a front end and
(Continued)

a sensing contour at a rear end. The sensing contour rests on the control disc. When a defined rotational speed is exceeded, the sensing contour lifts off the control disc. The latch contour engages with a locking tooth of the locking disc.

20 Claims, 10 Drawing Sheets

(51) Int. Cl.
*B66D 5/14* (2006.01)
*B66D 5/34* (2006.01)

(58) Field of Classification Search
CPC .......... B66D 1/34; B66D 1/36; B66D 1/7452; B66D 1/7468; B66D 1/7463; B66D 3/02; B66D 3/14; B66D 5/34; B66D 2700/0116; B66D 2700/0183; B66D 2700/05; B66D 1/7415; B66D 1/7489; B66D 1/365; B66D 3/04; B66D 2700/026; F16D 43/04; F16D 43/202; F16D 43/2028; F16D 41/12; A62B 1/06; A62B 1/10; A62B 1/18
USPC .......... 254/376
See application file for complete search history.

(56) References Cited

U.S. PATENT DOCUMENTS

| | | | | | |
|---|---|---|---|---|---|
| 4,274,620 | A | * | 6/1981 | Uher | B66D 1/72 254/351 |
| 4,513,952 | A | * | 4/1985 | Vandelinde | E04G 3/34 74/68 |
| 4,520,998 | A | * | 6/1985 | Flaig | B66D 5/04 188/185 |
| 4,589,523 | A | * | 5/1986 | Olson | A62B 35/0093 182/234 |
| 5,251,842 | A | * | 10/1993 | Zygutis | B60R 22/44 242/372 |
| 6,279,682 | B1 | * | 8/2001 | Feathers | A62B 35/0093 182/239 |
| 6,481,556 | B1 | | 11/2002 | Haupt | |
| 9,994,433 | B2 | * | 6/2018 | Guo | B66D 3/02 |
| 10,351,397 | B2 | * | 7/2019 | Uebel | B66D 5/34 |
| 2017/0240395 | A1 | | 8/2017 | Guo et al. | |
| 2018/0305189 | A1 | | 10/2018 | Uebel | |

FOREIGN PATENT DOCUMENTS

| | | | | | |
|---|---|---|---|---|---|
| CN | 209051391 | U | | 7/2019 | |
| DE | 3137523 | A1 | | 4/1983 | |
| DE | 3520967 | A1 | * | 12/1986 | B66D 5/14 |
| DE | 3520967 | A1 | | 12/1986 | |
| DE | 4105050 | A1 | | 8/1992 | |
| DE | 10148408 | C1 | | 11/2002 | |
| EP | 0279144 | B1 | | 10/1992 | |
| EP | 279144 | B1 | * | 10/1992 | B66B 5/16 |
| EP | 3395746 | A1 | | 10/2018 | |
| FR | 2391150 | A1 | | 12/1978 | |
| JP | S57196098 | U | | 12/1982 | |
| JP | S60191995 | A | | 9/1985 | |
| JP | H02147598 | A | | 6/1990 | |
| JP | H02123598 | U | | 10/1990 | |
| JP | H06507135 | A | | 8/1994 | |
| JP | 2002523280 | A | | 7/2002 | |
| JP | 2004277135 | A | | 10/2004 | |
| JP | 2006241807 | A | * | 9/2006 | |
| JP | 2006241807 | A | | 9/2006 | |

OTHER PUBLICATIONS

International Search Report or Written Opinion of International Application No. PCT/DE2020/100101 dated Jun. 8, 2020; 21pp.

Office Action for Chinese Application No. 202080052744.1 dated Feb. 16, 2023; 11pp.

* cited by examiner

LIFTING GEAR

RELATED APPLICATIONS

The present application is a National Phase of International Application Number PCT/DE2020/100101 filed Feb. 13, 2020 and claims priority of German Application Number 10 2019 120 036.9 filed Jul. 24, 2019.

FIELD

The present disclosure relates to lifting gear, such as a lever hoist.

BACKGROUND

A piece of lifting gear, such as a lever hoist, generally comprises a round steel chain as a means of support and pulling and is used to raise, lower and pull loads. The lifting motion is able to be generated by manual operation, compressed air or an electric motor. The present disclosure relates to a hand-operated lever hoist.

From DE 41 05 050 C2, a piece of lever-operated lifting gear is known which is also called a traction device or a chain hoist. The lifting gear is characterised by a supporting hook as an upper fastening element and load hook as a lower slinging element. The upper fastening element and the lower slinging element are directly interconnected by a housing. The slinging element is connected to a drive for the means of traction via a load chain as means of traction, which is located in the housing of the lifting gear. By a swivel movement of a manual lever, the drive for the means of traction is able to be set in rotation within the housing. To do this, the lever arm engages into a transmission device which is in turn connected to the drive for the means of traction. In this way, an object is able to be displaced or lashed.

As well as a drive with a shiftable ratchet mechanism, the drive for the means of traction comprises a load pressure brake, a load chain wheel and a transmission, wherein the transmission is designed as a planetary gearbox. The hand lever and the ratchet wheel of the ratchet mechanism sit on the end of a drive shaft which presses home the load pressure brake and the load chain wheel. On the other end of the drive shaft is located the transmission, which is then connected to the load chain wheel in such a way as to transfer torque.

The load pressure brake is composed of a ratchet wheel disc with recesses or teeth on its outer circumference, two friction elements located on both sides of the ratchet wheel disc, mostly friction discs or pads, and two pawls articulated on the housing, which are pressed under the effect of ratchet hook springs onto the ratchet wheel disc. Both friction elements are connected frictionally engaged firstly with the ratchet wheel disc and secondly with the pressure disc or ratchet wheel fastened to the shaft. The ratchet wheel is able to be displaced axially on a movement thread of the drive shaft.

The load pressure brake has the task of stopping the load carried by the lifting gear at any level or position, if the ratchet wheel is stationary. Then the ratchet wheel is pressed over the ratchet wheel disc and the integrated friction elements are pressed onto the pressure disc. The pawls are located in the circumferential recesses of the ratchet wheel disc. If the ratchet wheel is rotated in the lifting direction, the pawls slide over the teeth of the ratchet wheel disc until the ratchet wheel comes to a stop. Then the pawls are resting in the recesses of the ratchet wheel disc again. When lowering the load, the ratchet wheel is rotated in the opposite direction, by which the ratchet wheel slides axially on the movement thread of the drive shaft and frictionally engages contact with the friction elements of the ratchet wheel disc, and the pressure disc is raised. The load is able to be lowered until the shaft that continues to rotate compensates for the axial backlash again.

In some situations, such as when tensioning ropes or when lifting and stopping suspended loads, the acceleration is able to be so high and the rotational speed of the drive or drive shaft is able to be so excessive that the standard load pressure brake no longer engages, because the pawls no longer engage into the recesses of the ratchet wheel disc because of their inertia. Such an exceptional situation, even if extremely rare, is able to occur when working at great heights on overhead lines. There is then the risk of the load chain running out. Also, such a situation is able to occur when lowering against a jammed load chain. Even if the ratchet hooks of the load pressure brake are not free-running due to extraordinary circumstances such as, for example, corrosion or ice formation, such an exceptional situation is able to occur.

From EP 0 279 144 B1, a safety brake for a driven shaft is described. This comprises a brake disc and a curved disc for a roller that is able to be pressed on by a trigger spring, that causes a pawl to engage into a toothed ring on the shaft if there is excessive rotational speed of the shaft.

EP 3 395 746 A1 also proposes a further safety mechanism in the form of a safety brake in addition to the load pressure brake, which is used as a speed limiter for the centrifugal force of centrifugal elements.

SUMMARY

The disclosure is based on disclosing a piece of lifting gear that is improved in terms of safety and operation, such as a lever hoist, in which an unpermitted increase in rotational speed of the drive shaft is suppressed.

The solution of this task relates, according to the disclosure, a piece of lifting gear.

A piece of lifting gear, such as a lever hoist, comprises a housing in which a load chain wheel and drive shaft driving the load chain wheel via a transmission are supported such that they are able to rotate. A drive, a load pressure brake and a safety brake are provided. A load chain is able to be moved via the load chain wheel.

The safety brake exhibits a locking disc with locking teeth and a control disc with control cams as well as a catch hook. According to the disclosure, the locking disc and the control disc are able to be rotated in relation to one another, in which the rotation is limited by a rotation limiter. The catch hook is arranged so as to be able to move in a swiveling manner. The catch hook has two webs and exhibits a latch contour on the front end and a sensing contour on the rear end. The catch hook is arranged on the locking disc and control disc in such a way that the sensing contour rests under the effect of a spring element on the control disc, or rests on the external contour of the control disc and slides along this when the control disc rotates. The latch contour is able to be brought to engage lockingly with a locking tooth of the locking disc. This means that the catch hook is directed via the control disc in normal operation with the sensing contour and the latch contour does not engage in the locking disc. In the triggering case, when a defined rotational speed is exceeded, the sensing contour of the catch hook of the control disc or the control cams of the control disc are raised and the latch contour of the catch hook hooks into a locking tooth of the locking disc. In so doing, the locking disc is held while the control disc arranged coaxially behind the locking disc continues to turn along a specified rotational path of the rotation limiter until the rotational path is exhausted and the locking disc and the control disc interlock.

In so doing, a positive-fit connection between the drive shaft and the lifting gear is produced. Emergency braking occurs. Overrunning of the load chain wheel or running out of the load chain is suppressed. During the interconnection, the control disc actively pushes the catch hook into the recess or the locking tooth of the locking disc. In the locked position, the control disc also prevents the locking hook from turning back, so that the safety brake is locked.

An aspect of the disclosure provides that the rotation limiter exhibits at least one curved track and one stopper which is able to be displaced along the curved track. In the end position, therefore after exhausting the rotational path between the locking disc and control disc, the stopper comes lockingly to a stop and the end of the curved track.

The curved track is formed as a slot. The slot is formed in the control disc. A slot is formed as an arc, with radius about the centre of the control disc. There are several slots displaced mutually offset on a pitch circle provided in the control disc. However, the curved track is also able to be formed as a groove. This is able to be provided in the control disc or also in the locking disc.

The stopper is a pin. The stopper pin or pins are fastened into the locking disc and protrude against this in the direction of the control disc, in which they engage into the slots.

A further configuration is provided that ratchet elements are incorporated between the locking disc and the control disc. These fix the locking disc and the control disc in the starting position or in the end position. The ratchet elements are formed as balls.

The ratchet elements are held in take-ups and act together with the ratchet surfaces. A further configuration provides that the take-ups are in the control disc and the ratchet surfaces are formed in the locking disc.

Several locking teeth are arranged, uniformly distributed on the circumference of the locking disc. Also, several control cams are arranged, uniformly distributed on the circumference of the control disc. The control cams are formed by the contour of the control disc itself. To do this, the control disc is configured as a triangle with a rounded external contour.

The control disc exhibits a central support provided with internal toothing. With the internal toothing, the control disc sits on a longitudinal section of the drive shaft provided with external toothing. On the central support, the control disc is positioned with a central supporting section. The locking disc is secured onto the support by securing elements.

In at least some embodiments, in the starting position of the locking disc and control disc, the rear external contour of the locking teeth is flush with the external contour of the control disc. The control disc covers the adjacent flat side of the locking disc.

The catch hook of the safety brake is supported on a side plate that is able to move in swiveling manner integrated into the housing, supported on a pin. The spring element is a helical spring.

Optionally, damping elements are able to be incorporated between the locking disc and control disc, to dampen the braking effect for emergency braking.

After triggering the safety brake, the locking disc is in the locked end position. To release the locking mechanism, the locking disc and the control disc must be aligned flush with each other again. To do this, an unlocking for resetting of the locking disc and control disc in their starting position is provided. The unlocking comprises a stop valve, that is arranged to lock the locking disc, whereas the control disc connected to the drive shaft is rotated in the direction of lifting (clockwise) until both discs are aligned flush with each other, back in the starting position.

In many applications being able to prevent putting back into operation after triggering or emergency braking is necessary. To do this, a return lock is provided which prevents the locking disc from turning back and the control disc to its starting position. In so doing, the safety brake remains in the locked state. An illustrative example of the return lock provides that clamping rollers are positioned in recesses of the locking disc. These are arranged and designed in such a way that resetting of the locking disc and control disc to the starting position is prevented.

So that in this embodiment, there is no undesirable triggering of the safety brake, for example, by pulling out manually, the starting position is secured with a shear pin. Only when exceeding a certain threshold, depending on the rotational speed and torque, does the shear pin shear off and the safety brake performs the emergency braking.

The lifting gear according to the disclosure is able to be deployed in the most varied of applications. Any application with returning loads, for example, in constructing overhead lines or even to secure personnel, is able to be used.

The lifting gear is compact and of light construction. The additional securing function via the safety brake is achieved with few parts. The mechanics require active movement so that falling of the spring, seizing of the locking ratchet of the load pressure brake etc. lead to the safety brake being triggered. The safety brake locks automatically. In so doing, the catch hook always remains engaged, even when the load continues to oscillate.

BRIEF DESCRIPTION OF THE DRAWINGS

The disclosure is explained in more detail in the following using the drawings. They indicate as follows.

DETAILED DESCRIPTION

Figure 1:
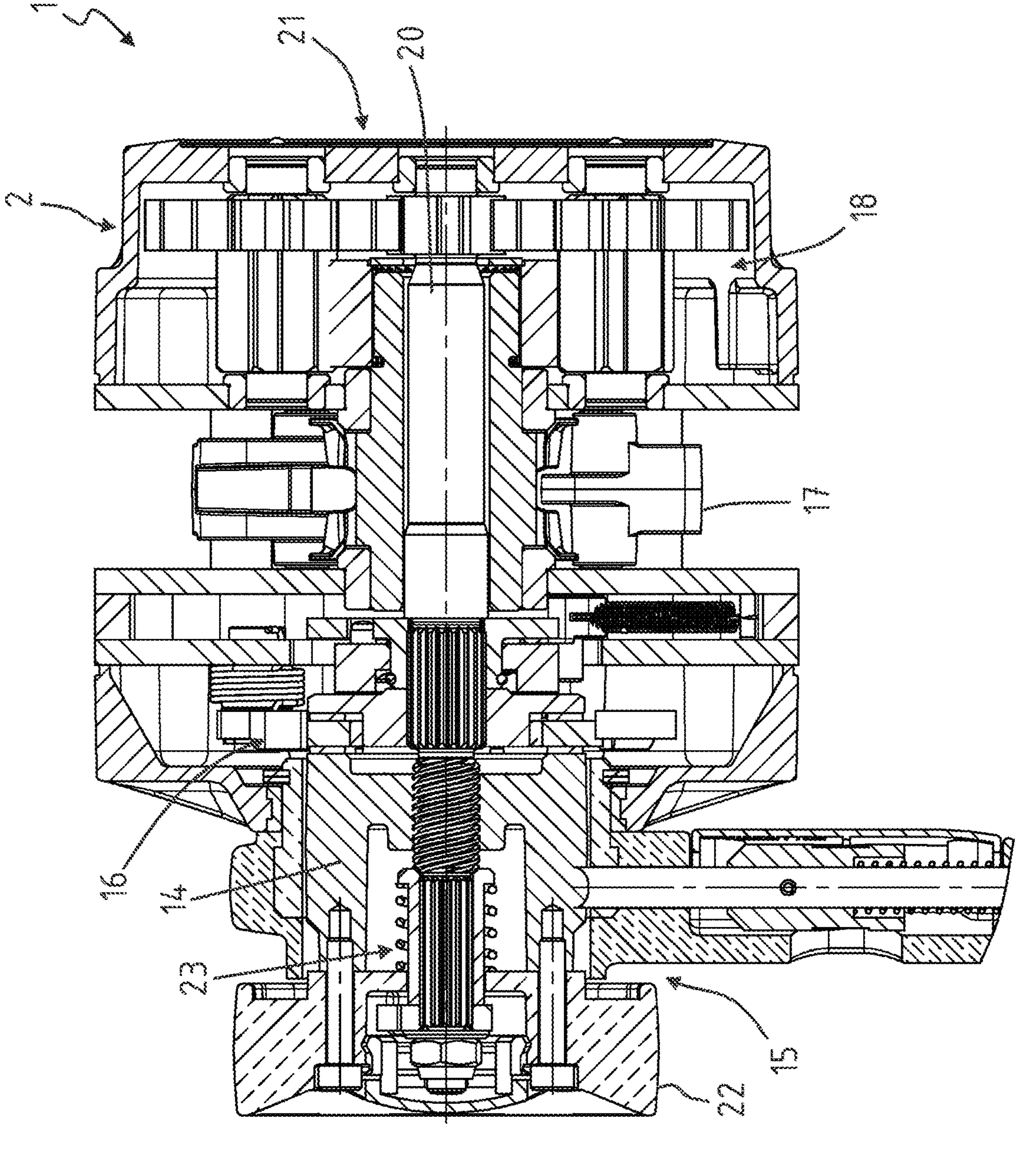
FIG. 1 shows lifting gear in the form of lever hoist in a longitudinal section in accordance with the disclosure.
Figure 2:
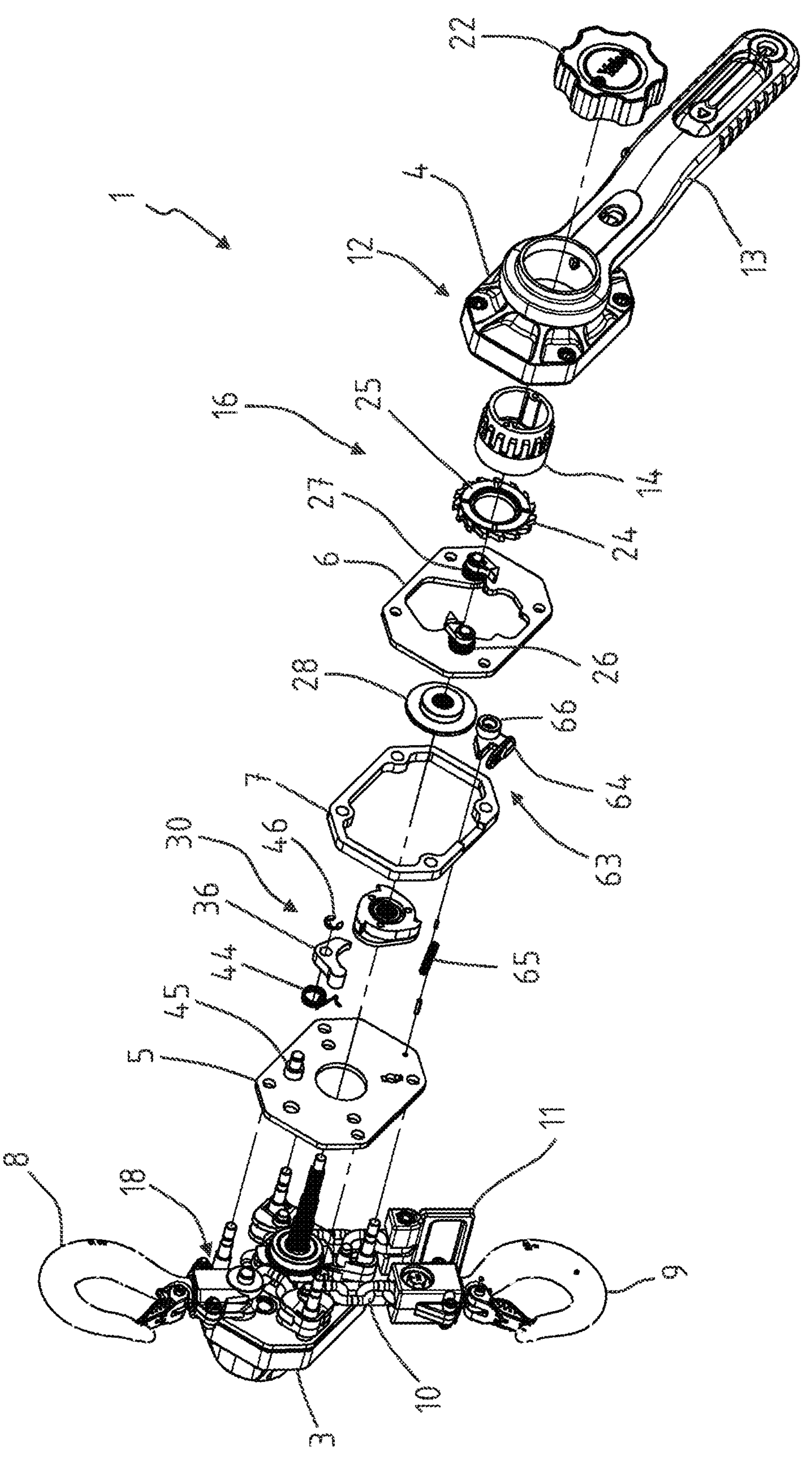
FIG. 2 shows the lever hoist in an explosion illustration of its components in accordance with the disclosure.

FIG. 1 and FIG. 2 show a piece of lifting gear according to the disclosure in the form of a manually-operated lever hoist 1. A component of the lever hoist 1 is a housing 2 which is composed of several housing parts 3, 4 and side plates 5, 6 and distance frame 7. The lever hoist 1 is characterised by a supporting hook 8 as an upper fastening element and load hook 9 as a lower slinging element. The supporting hook 8 and the load hook 9 are directly interconnected via the housing 2. The load hook 9 is slung onto one end of a load chain 10. A chain end piece 11 is provided at the other end of the load chain 10. Via a drive for the means of traction, the load chain 10 is able to be moved. The drive for the means of traction comprises a drive 12 with a hand lever 13, a ratchet wheel 14 and a shiftable ratchet mechanism 15, a load pressure brake 16, a load chain wheel 17 and a transmission 18. The hand lever 13 and the ratchet wheel 14 of the ratchet mechanism 15 sit on the end 19 of a drive shaft 20 which press home the load pressure brake 16 and the load chain wheel 17. On the other end 21 of the drive shaft 20 is located the transmission 18, which is connected to the load chain wheel 17 in such a way as to transfer torque. A hand wheel 22 is used to displace the ratchet wheel 14 axially on the drive shaft 20, to operate a free-running mechanism 23 of the lever hoist 1.

Figure 3:
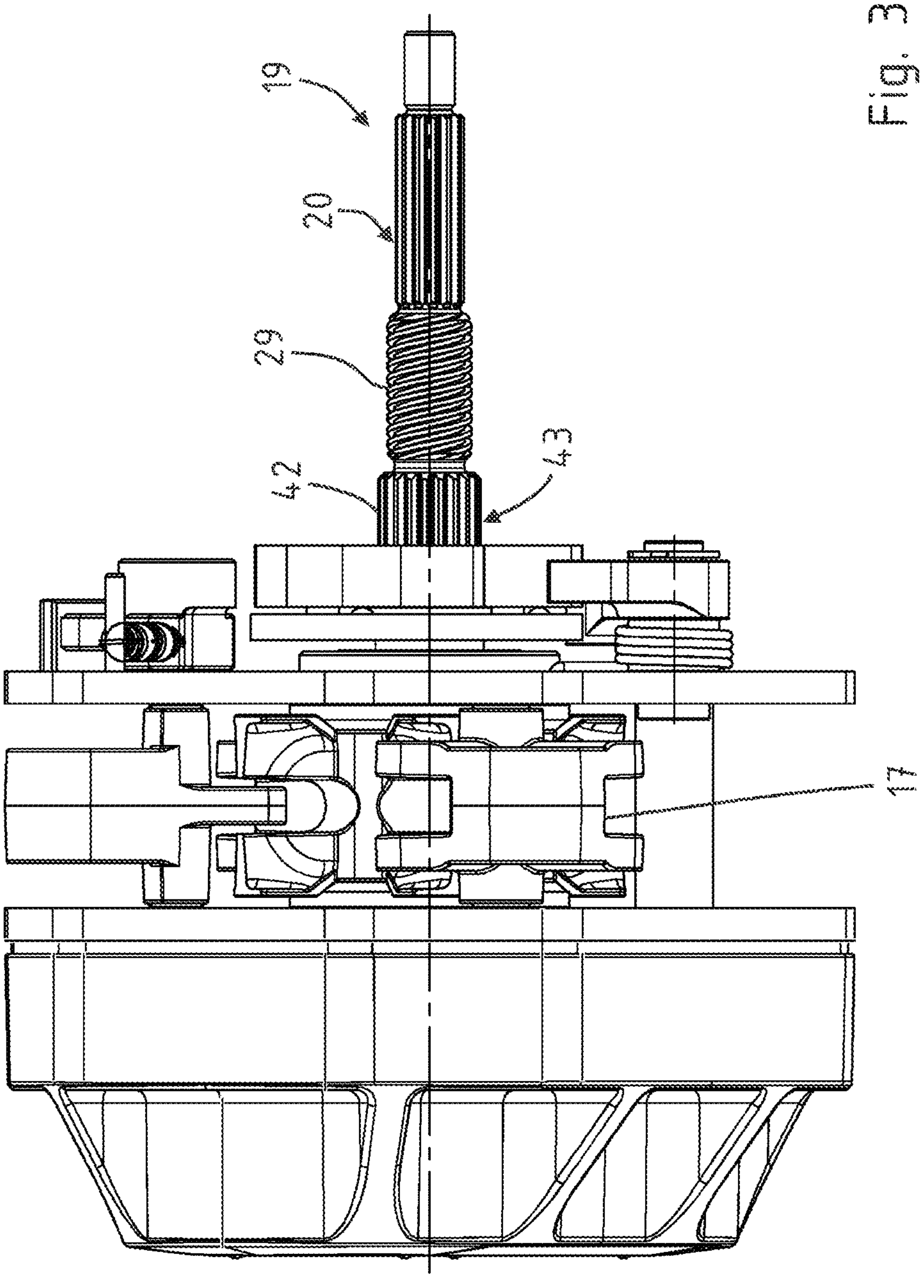
FIG. 3 shows a side view of a part of the lever hoist in accordance with the disclosure.
Figure 4:
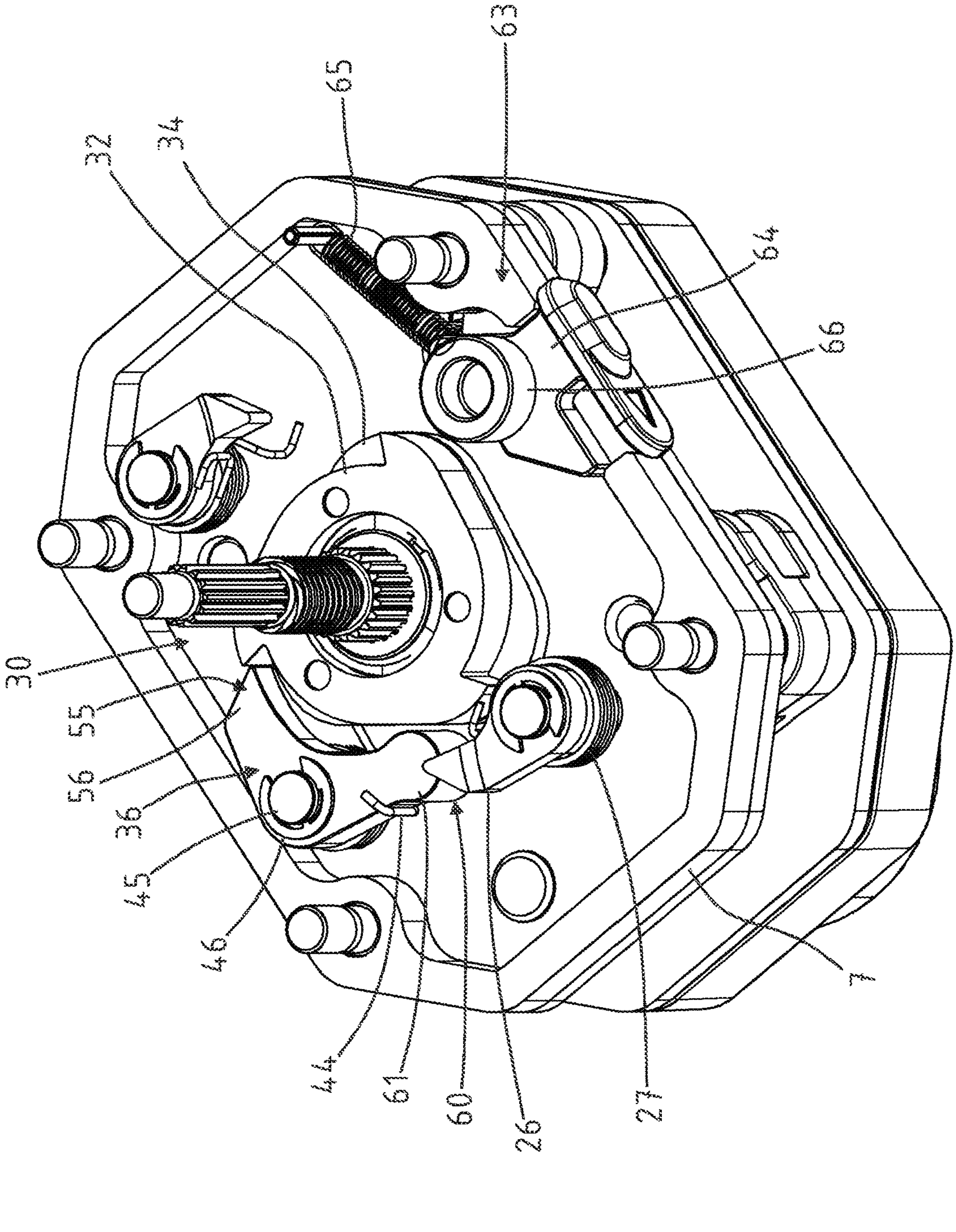
FIG. 4 shows a perspective view of the safety brake of the lever hoist in accordance with the disclosure.
Figures 5, 6, 7, 8, 9, 10:
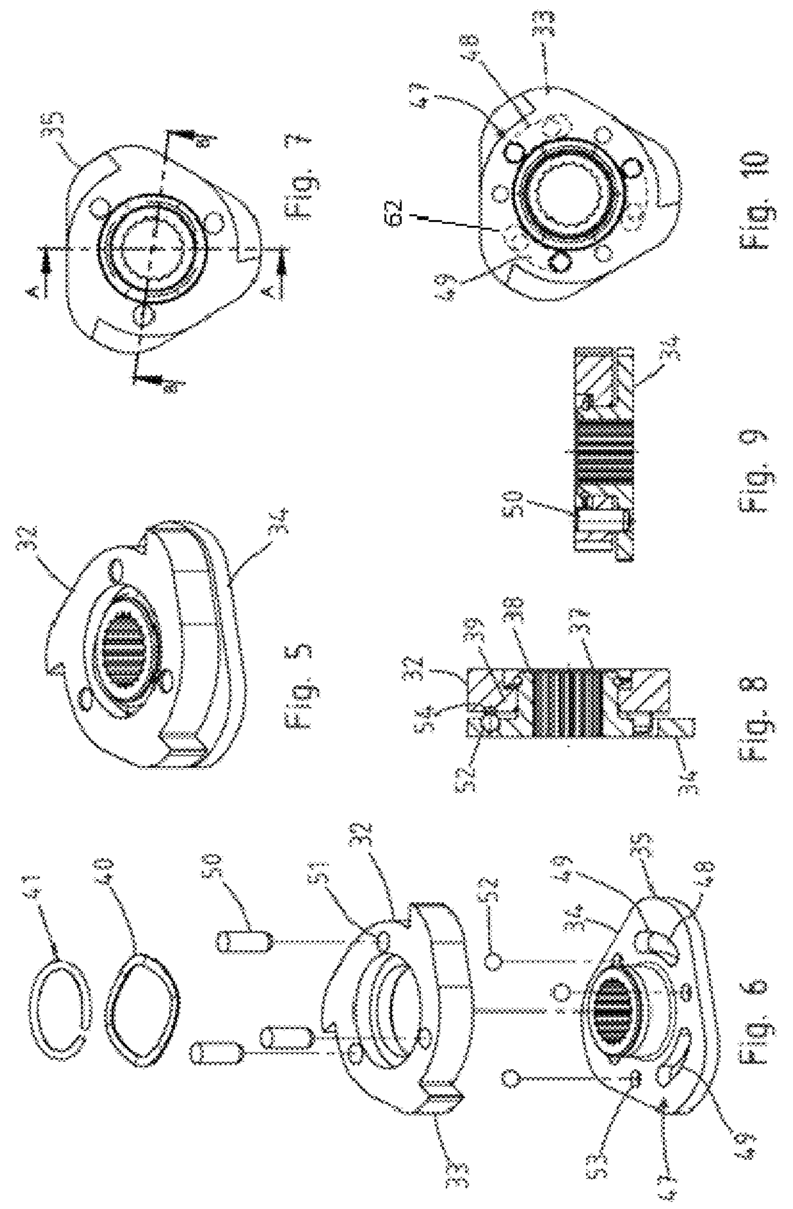
FIG. 5 shows a perspective view of the locking disc and control disc of the safety brake in accordance with the disclosure.
FIG. 6 shows components of the safety brake in an explosive form of illustration in accordance with the disclosure.
FIG. 7 shows a view from above of the illustration of FIG. 5 in accordance with the disclosure.
FIG. 8 shows a cross-section through the illustration of FIG. 7 along line A-A in accordance with the disclosure.
FIG. 9 shows a cross-section through the illustration of FIG. 7 along line B-B in accordance with the disclosure.
FIG. 10 shows the illustration according to FIG. 5 in a view from below in accordance with the disclosure.

On its external circumference, the load pressure brake 16 exhibits a ratchet wheel disc 24 provided with teeth. On both sides, the ratchet wheel disc 24 is provided with friction elements 25 in the form of friction pads. The load pressure brake 16 exhibits two pawls 26 supported in the housing 2 on the side plate 6 such that they are able to swivel, which are compressed under the effect of locking hook springs 27 onto the ratchet wheel disc 24. A pressure disc 28, on which the ratchet wheel disc 24 is supported, which forms part of the load pressure brake 16. The ratchet wheel 14 is able to be displaced axially on a movement thread 29 of the drive shaft 20. FIG. 3 shows the lever hoist 1 with ratchet wheel 14, hand lever 13 and hand wheel 22 removed.

The load pressure brake 16 has the task of holding the load supported by the lever hoist 1 when the ratchet wheel 14 is stationary. Then the ratchet wheel 14 is pressed over the ratchet wheel disc 24 and the integrated friction elements 25 are pressed onto the pressure disc 28. The pawls 26 are located in the circumferential recesses of the ratchet wheel disc 24. If the ratchet wheel 14 is rotated in the lifting direction, the pawls 26 slide over the teeth of the ratchet wheel disc 24 until the ratchet wheel 14 comes to a stop. Then the pawls 26 are resting in the recess of the ratchet wheel disc 24 again. When lowering the load, the ratchet wheel 14 is rotated in the opposite direction, by which the ratchet wheel 14 slides axially on the movement thread 29 of the drive shaft 20 and frictionally engages contact with the friction elements 25 of the ratchet wheel disc 24, and the pressure disc 28 is raised. The load is able to be lowered until the drive shaft 20 that continues to rotate compensates for the axial backlash again.

In addition to the standard load pressure brake 16, the lever hoist 1 exhibits a safety brake 30, 31. The safety brake 30, 31 has the task of undertaking emergency braking in extreme situations in which there is so high a rotational speed of the drive shaft 20 that the load pressure brake 16 no longer engages due to inertia.

A safety brake 30 and its operation are described with reference to FIG. 4 to FIG. 17. A second illustrative example of a safety brake 31 is explained using FIG. 18 to FIG. 23. Components or sub-components corresponding to each other are provided with the same reference number. The safety brake 30, 31 is arranged in the direction to the load chain wheel 17 co-axially underneath or behind the load pressure brake 16.

The safety brake 30, 31 exhibits a locking disc 32 with locking teeth 33 and a control disc 34 with control cams 35 as well as a catch hook 36. On the circumference of the locking disc 32 several locking teeth 33, three in the illustrative example, are arranged uniformly distributed. The control disc 34 is configured in a triangular shape with the control cams 35 formed in a rounded shape on their circumference. The control disc 34 exhibits a central support 38 provided with internal toothing 37, on which the locking disc 32 is positioned with a central storage section 39 and is secured in position by securing elements 40, 41. Via the central support 38 and the internal toothing 37, the control disc 34 and with the control disc 34 the locking disc 32 is held onto a threaded section 43 of the drive shaft 20 provided with external toothing 42.

The catch hook 36 is arranged so as to be able to move in a swiveling manner on the side plate 5 of the lever hoist 1. By incorporating a spring element 44 in the form of a helical spring, the catch hook 36 is supported on a pin 45 on the side plate 5 and secured by a securing ring 46. The support of the catch hook 36 on the pin 45 is in the central longitudinal region of the catch hook 36 so that the catch hook 36 is supported like a see-saw.

The locking disc 32 and the control disc 34 are able to be rotated in relation to each other. The rotation of locking disc 32 and control disc 34 in relation to each other is limited by a rotation limiter 47. The rotation limiter 47 comprises a curved track 48 which is formed in a slot 49 in the shape of a section of a circular arc in the control disc 34. Along the curved track 48, a stopper 50 in the form of a pin is able to be displaced. Three slots 49 are arranged uniformly offset in the control disc 34. Correspondingly, three pins are incorporated as stoppers 50 in the installation holes 51 of the locking disc 32. The stoppers 50 protrude in the direction of the control disc 34 compared with the locking disc 32 and engage into the slots 49. In the illustrative example shown here, the rotation limiter 47 allows a rotation of the locking disc 32 compared with the control disc 34 by 45°.

Between the locking disc 32 and the control disc 34, ratchet elements 52 in the form of steel balls are incorporated. The ratchet elements 52 fix the locking disc 32 and the control disc 34 in the starting position or in the end position after a rotation. The ratchet elements 52 are held in take-ups 53 in the control disc 34 and contact ratchet surfaces 54 that are the shape of spherical sections in the control disc 32 and act together with these as a counter bearing and inhibiting movement.

The catch hook 36 exhibits a latch contour 56 on the front end 55. The latch contour 56 exhibits a catch tooth 57 formed as a point with a catch flank 58 on the abutting side which is configured to be adapted to a front locking flank 59 of a locking tooth 33 of the locking disc 32.

On the rear end 60 a sensing contour 61 is formed on the catch hook 36. To do this, the rear end 60 of the catch hook 36 is formed of a rounded shape. With the sensing contour 61, the catch hook 36 rests under the effect of the helical spring against the outer contour of the control disc 34. The spring element 44 has the effect that in normal operation the latch contour 56 is outside the external circumference of the locking disc 32. In normal operation, the catch hook 36 slides with the rear sensing contour 61 along the control disc 34. The front latch contour is 56 is raised.

When a certain excessive rotational speed is exceeded, the sensing contour 61 of the catch hook 36 lifts as a result of the mass inertia and the acting acceleration forces of the control disc 34 or the control cams 35. The catch hook 36 tips and rotates about the pin 35 in the locking disc 32. The latch contour 56 of the catch hook 36 hooks into a locking tooth 33 of the locking disc 32 and comes to rest there with the catch flank 58 onto the locking flank 59. Consequently, the locking disc 32 is held while the control disc 34 arranged coaxially behind the locking disc 32 continues to rotate along the specified rotation path of the rotation limiter 47. The rotation occurs until the stopper 50 comes to a stop at the end 62 of the slots 49 situated in the direction of rotation. The locking disc 32 and the control disc 34 are then locked in relation to each other. In this way, a positive-fit connection between the drive shaft 20 and the lever hoist 1 is produced. Further overrunning of the load chain wheel 17 or running out of the load chain 10 is suppressed.

Figure 11:
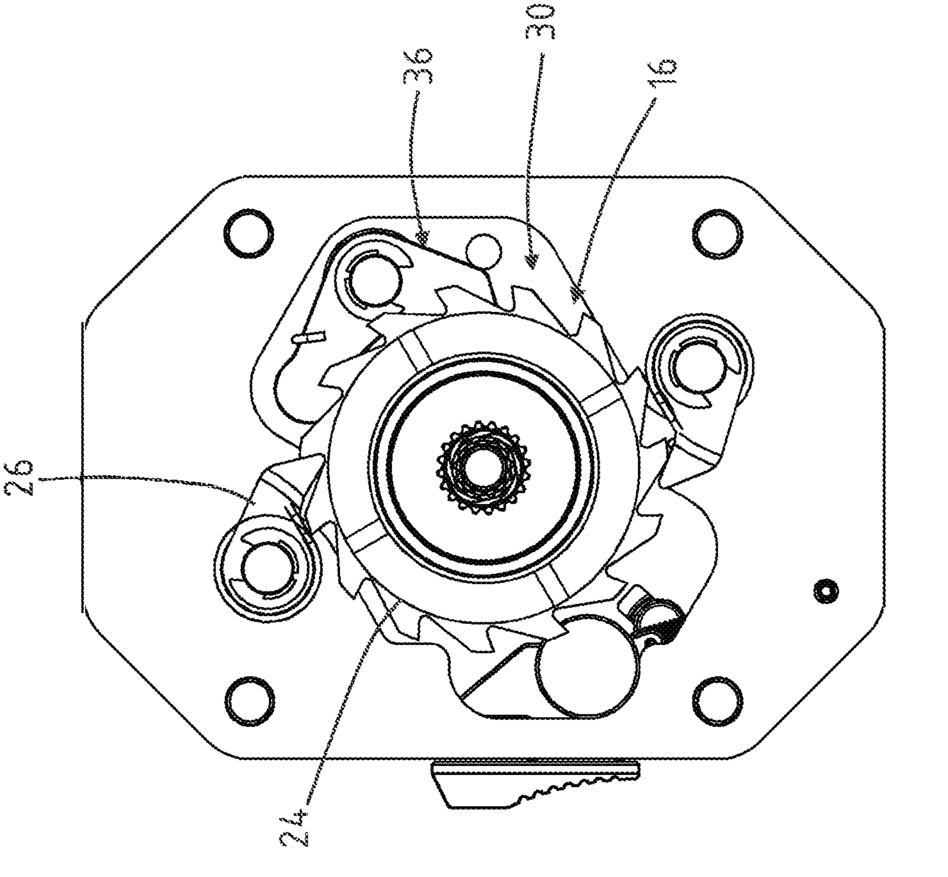
FIG. 11 shows the open lever hoist with a view in the region of the load pressure brake and the safety brake in a normal situation in accordance with the disclosure.

FIG. 11 shows a normal situation of the load pressure brake 16 and safety brake 30. The pawls 26 engage in the ratchet wheel disc 24 and hold the load.

Figure 12:
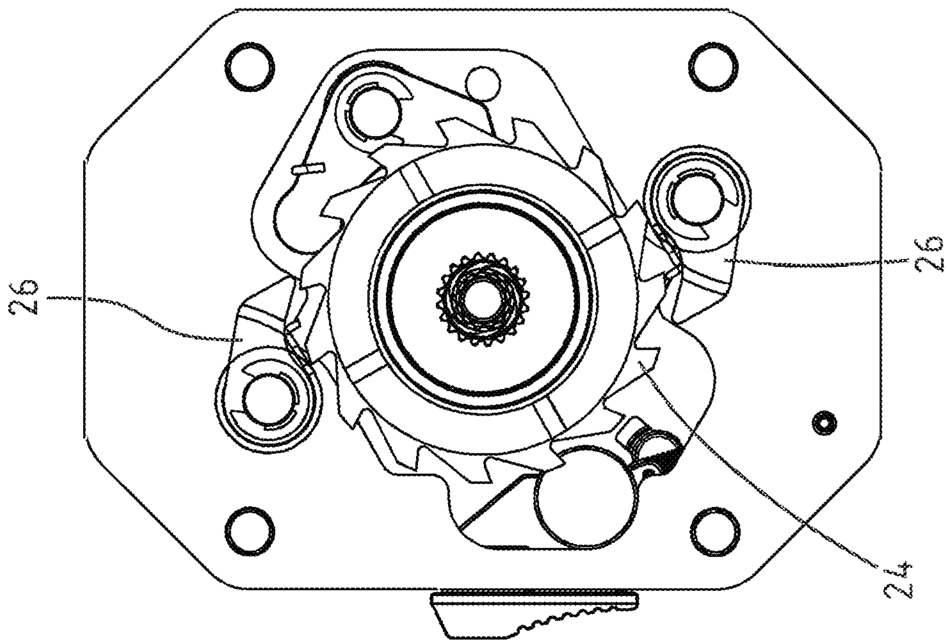
FIG. 12 shows the illustration according to FIG. 11 in a problem situation in accordance with the disclosure.

FIG. 12 shows a problem situation. The pawls 26 of the load pressure brake 16 are not free running. The pawls 26 do not engage into the ratchet wheel disc 24. A load cannot be held. A dangerously excessive speed compared with the pulling direction of the lever hoist 1 is able to occur associated with the load chain 10 running out.

Figure 14:
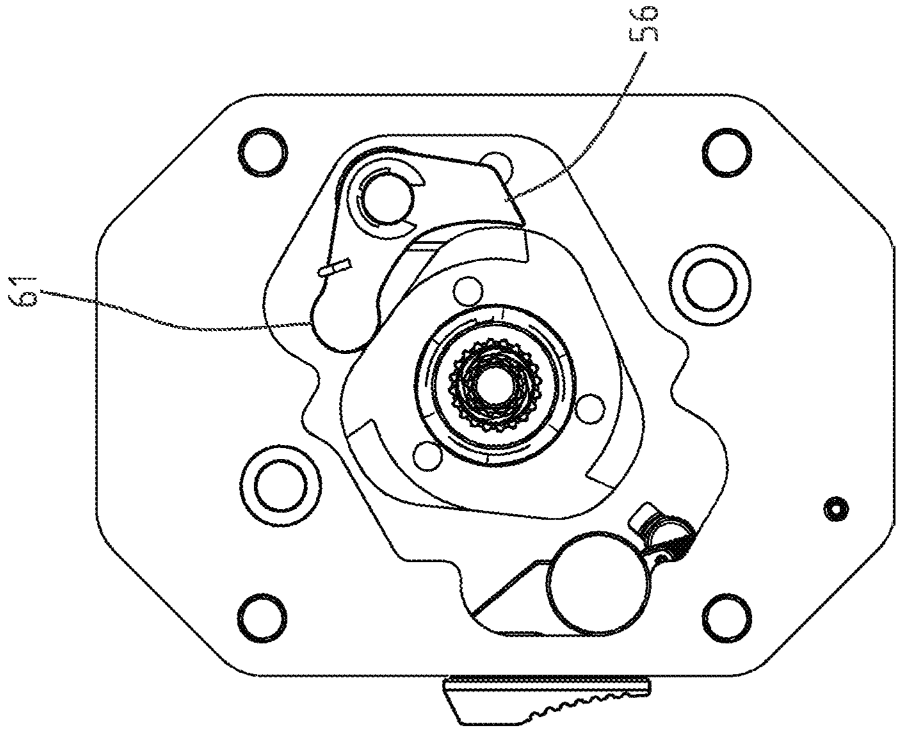
FIG. 14 shows the safety brake in a second operating situation in accordance with the disclosure.
Figure 13:
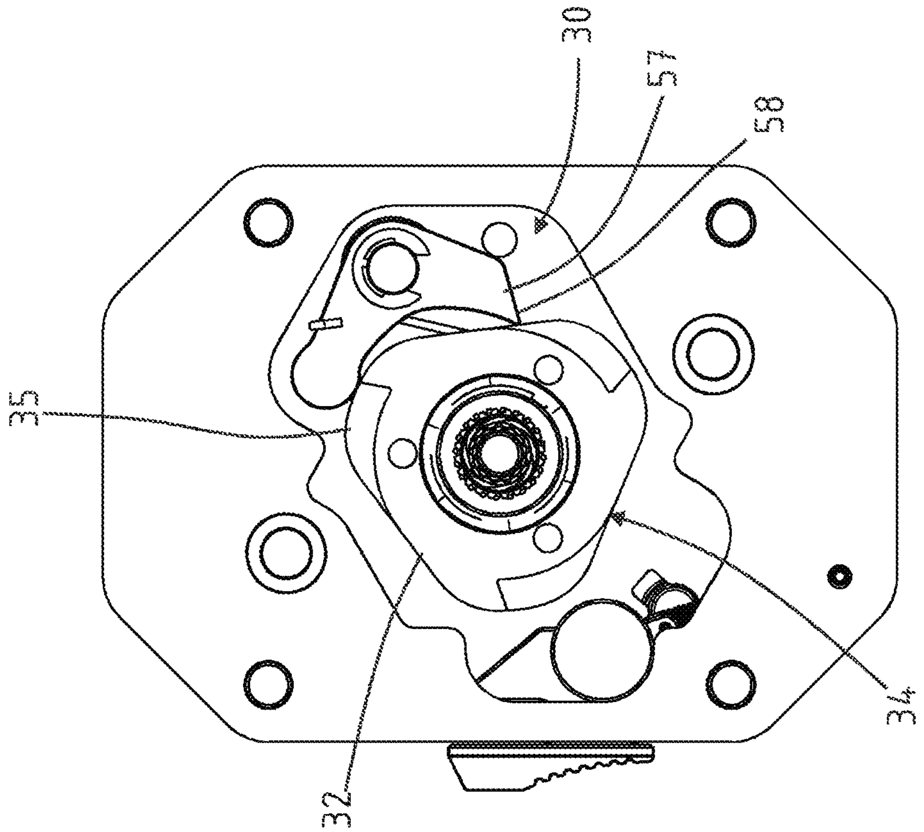
FIG. 13 shows a view of the safety brake of the lever hoist in a first operating situation in accordance with the disclosure.
Figure 16:
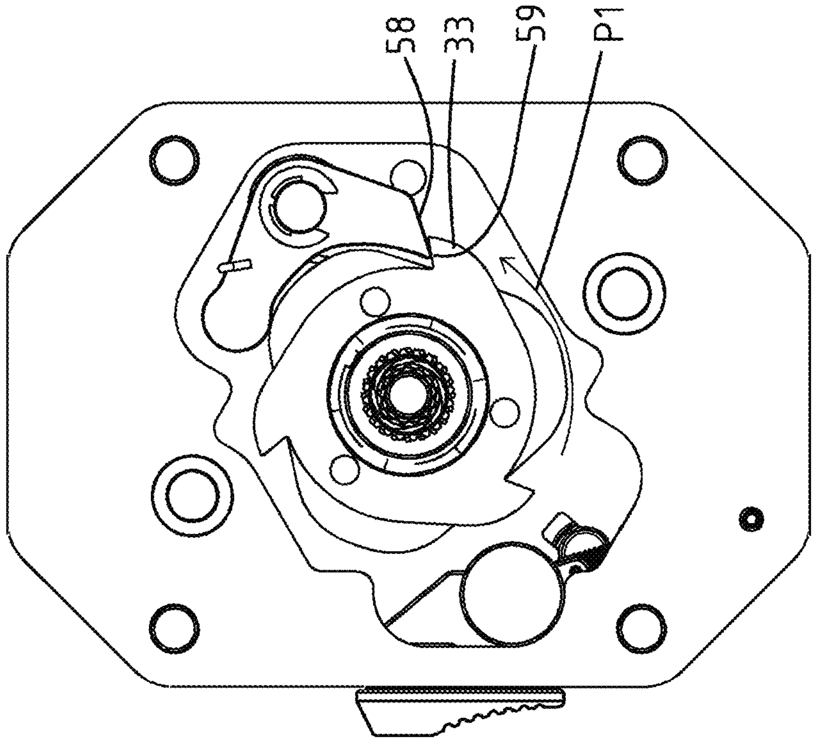
FIG. 16 shows the safety brake in a fourth operating situation in accordance with the disclosure.
Figure 15:
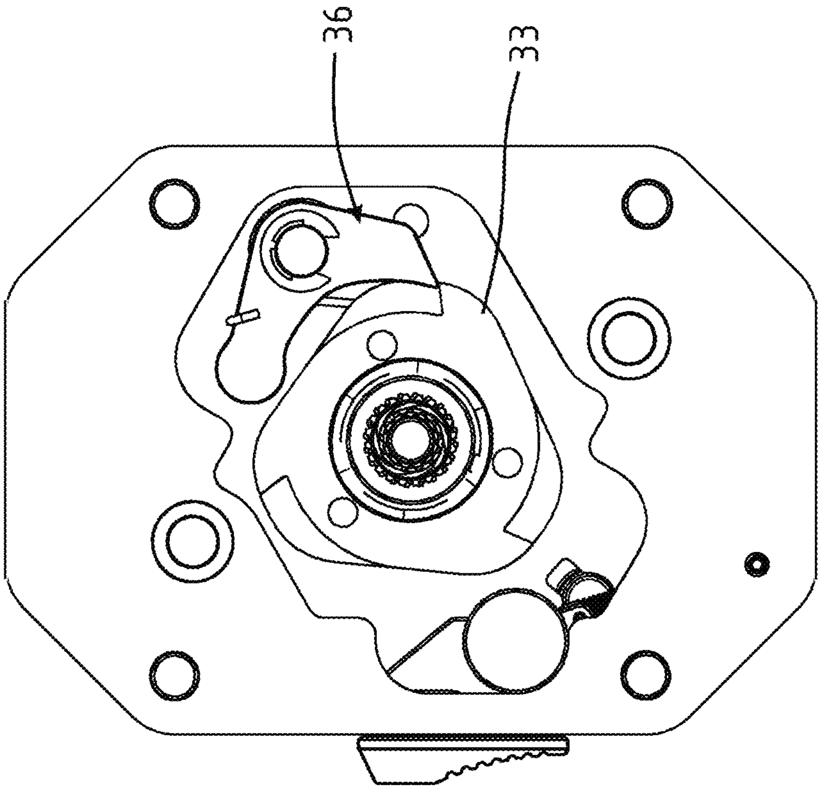
FIG. 15 shows the safety brake in a third operating situation in accordance with the disclosure.
Figure 17:
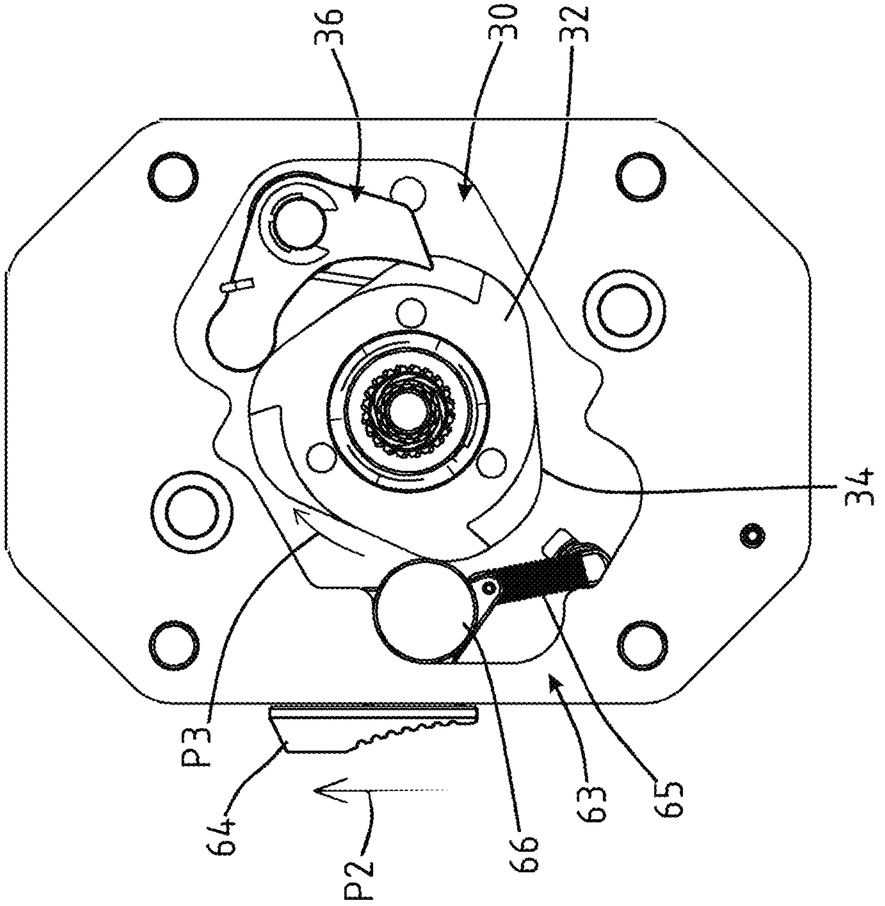
FIG. 17 shows the illustration of the safety brake in an unlocking process for resetting the locking disc and control disc in their starting position in accordance with the disclosure.
Figure 18:
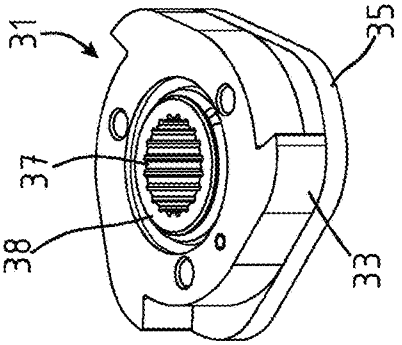
FIG. 18 to FIG. 23 show a second illustrative embodiment of safety brake with a return lock in accordance with the disclosure.

FIG. 13 and FIG. 14 shows the safety brake 30 respectively in a normal situation or starting position. The locking disc 32 and the control disc 34 are designed to be flush so that the rear external contour of the locking teeth 33 are covered with the external contour of the control disc 32. The sensing contour 61 of the catch hook 36 is pressed by the spring force of the helical spring against the external contour of the control disc 34 and slides along the control cams 35. The sensing contour 61 is located both in the top dead centre of the control disc 34 (FIG. 13) and in the bottom dead centre of the control disc 34 (FIG. 14) on a control cam 35. During the circulation of the control disc 34 and the locking disc 32, the front latch contour 56 of the catch hook 36 is raised out of the active region of the locking disc 32 or its locking teeth 33.

With increasing acceleration of the drive shaft 20 and with this the safety brake 30, therefore with excessive rotational speed, for example, caused by a falling load, the sensing contour 61 of the catch hook 36 is accelerated outwards and lifts from the control disc 34. The front catch tooth 57 of the latch contour 56 hooks into the locking disc 32 (see FIG. 15) and its abutting edge catch flank 58 comes to a stop lockingly on the locking flank 59 of a locking tooth 33 (see FIG. 16). After the catch hook 36 has dropped in, the control disc 34 continues to rotate driven from the load about 45° in an anticlockwise direction (arrow P1) and thus the ratchet wheel 14 locks. This effect is self-reinforcing, i.e., the deeper the catch hook 36 falls in, the greater the sensing contour 61 is raised on the opposite side by the control disc 34.

To lift the blocking of the safety brake 30 and to put the control disc 34 and the locking disc 32 back into the flush starting position, a release 63 is provided. This comprises a slider 64 for activation of the release 63 and a blocking body 66 under the effect of a tension spring 65. By operating the slider 64 (arrow P2), this locks the locking disc 32 with the blocking body 66 and holds the locking disc 32 firmly so that the locking disc 32 is prevented from rotating, while the control disc 34 is operated in the lifting direction (clockwise) (arrow P3) via the hand wheel 22 or the hand lever 13. In this way, the locking disc 32 and the control disc 34 are displaced in relation to each other and brought into their flush starting position.

FIG. 18 to FIG. 23 show a second illustrative embodiment of a safety brake 31. As described above, this exhibits a locking disc 32 with locking teeth 33 and a control disc 34 with control cams 35 as well as a catch hook not shown in FIG. 18 to FIG. 23. The catch hook corresponds to the previous explanation. The same applies to the rotation limiter and the function of the safety brake 31.

A return lock 67 is provided for the safety brake 31. A return lock 67 prevents a rotation of the locking disc 32 and control disc 34 in its starting position, after the safety brake 31 has triggered, therefore standing in its blocked state. The return lock 67 is characterised by recesses 68 in the locking disc 32 arranged offset on a pitch circle. Clamping rollers 69 are accommodated there. The rear wall 70 of a pocket-shaped recess 68 runs inclined so that the recess 68 tapers anticlockwise. A wedging effect arises between the locking disc 32 and the control disc 34 via the clamping rollers 69, so that the return lock 67 prevents rotation of the locking disc 32 and control disc 34 in relation to each other.

Figure 19:
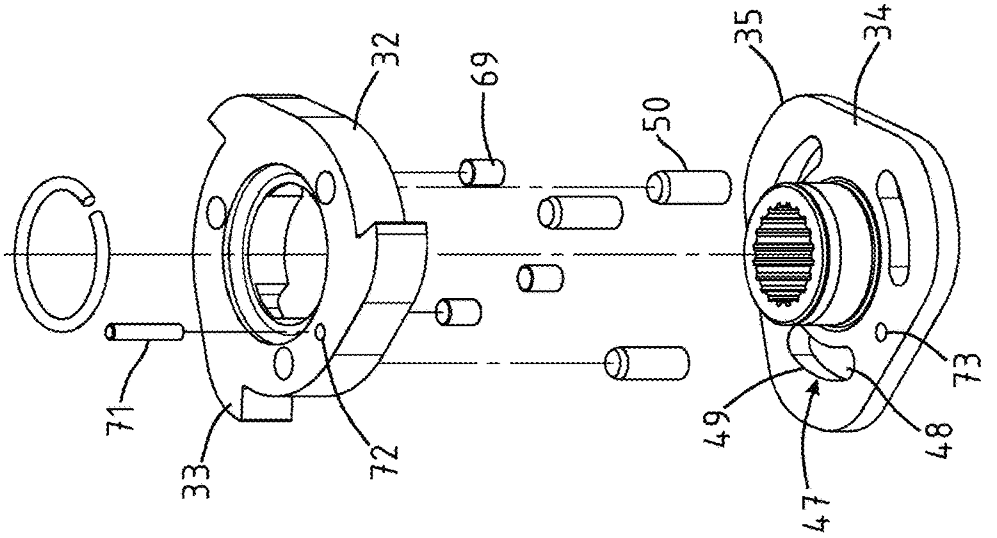
Figure 20:
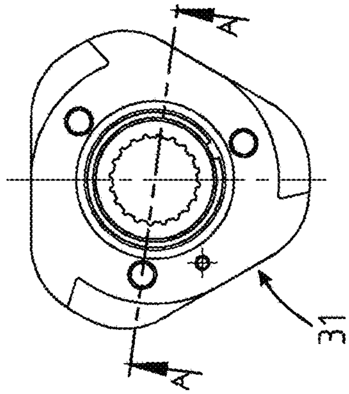
Figure 21:
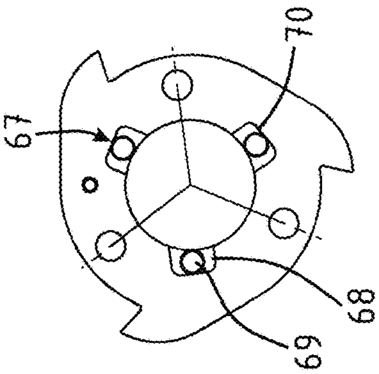
Figure 22:
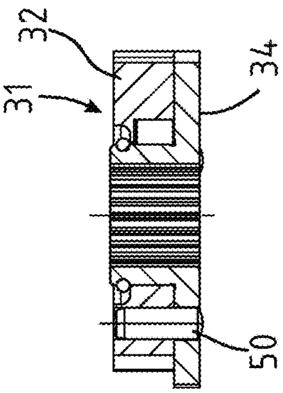
Figure 23:
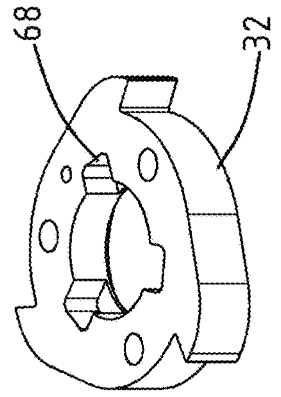

In the illustration of FIG. 19, a shear pin 71 is incorporated into the safety brake 31. The shear pin 71 is driven through an installation hole 72 in the locking disc 32 into an installation hole 73 in the control disc 34. The shear pin 71 prevents an undesirable triggering of the safety brake 31, for example, when pulling out manually. The shear pin 71 secures the safety brake 31 in the starting position. Only when a certain threshold is exceeded when locking the safety brake 31 is the shear pin 71 sheared off and the safety brake 31 is able to activate emergency braking.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A lifting gear, comprising:

a housing;

a load chain wheel;

a drive shaft configured to drive the load chain wheel via a transmission, wherein the load chain wheel and the drive shaft are rotatably supported in the housing;

a load pressure brake;

a safety brake; and a load chain movable via the load chain wheel, wherein the safety brake exhibits a locking disc with locking teeth, a control disc with control cams, and a catch hook, wherein the locking disc and the control disc are held by the drive shaft and rotatable in a relative rotation with respect to each other, wherein the relative rotation is limited by a rotation limiter, wherein the catch hook is arranged so that the catch hook is movable in a swiveling manner, wherein the catch hook exhibits a latch contour on a front end and a sensing contour on a rear end, wherein the sensing contour rests under the effect of a spring element on the control disc, wherein, with increasing acceleration of the drive shaft, the sensing contour lifts from the control disc with excessive rotational speed and the latch contour is brought to engage lockingly with a locking tooth of the locking disc to hold the locking disc while the control disc continues to turn along a specified rotational path of the rotation limiter until the rotational path is exhausted and the locking disc and the control disc interlock, wherein the control disc actively pushes the catch hook into the locking tooth of the locking disc to obtain a locked position in which the control disc also prevents the catch hook from turning back, so that the safety brake is locked, and wherein the catch hook is trapped at both ends thereof such that the catch hook is caught at said both ends by the control cam and the locking tooth such that the control disc fits into a pocket of the catch hook.

2. The lifting gear according to claim 1, wherein the rotation limiter exhibits at least one curved track and a stopper displaceable along the at least one curved track.

3. The lifting gear according to claim 2, wherein the at least one curved track comprises a slot or a groove in the control disc or the locking disc.

4. The lifting gear according to claim 2, wherein the stopper is a pin.

5. The lifting gear according to claim 1, wherein the safety brake further comprises ratchet elements incorporated between the locking disc and the control disc.

6. The lifting gear according to claim 1, wherein a plurality of locking teeth are uniformly distributed on a circumference of the locking disc.

7. The lifting gear according to claim 1, wherein the control cams are uniformly distributed on a circumference of the control disc.

8. The lifting gear according to claim 1, wherein the control disc comprises a central support provided with an internal toothing, on which the locking disc is positioned with a central supporting section and is secured in position by a securing element.

9. The lifting gear according to claim 1, wherein in a starting position of the locking disc and the control disc, a rear external contour of the locking teeth is flush with an external contour of the control disc.

10. The lifting gear according to claim 1, wherein the catch hook is supported on a side plate of the housing.

11. The lifting gear according to claim 1, wherein the safety brake further comprises a release configured to reset the locking disc and the control disc to a starting position.

12. The lifting gear according to claim 1, wherein the safety brake further comprises a return lock to prevent a rotation of the locking disc and the control disc in a starting position.

13. A lifting gear, comprising:

a housing;

a load chain wheel;

a drive shaft configured to drive the load chain wheel via a transmission, wherein the load chain wheel and the drive shaft are rotatably supported in the housing;

a load pressure brake; and a safety brake comprising:

a locking disc with locking teeth, a control disc having control cams, a rotation limiter, a catch hook moveable in a swiveling manner, and a spring element, wherein the locking disc is rotatable relative to the control disc, and the rotation limiter is configured to limit a relative rotation of the locking disc and the control disc, both the locking disc and the control disc are held by the drive shaft, the catch hook comprises a latch contour on a front end of the catch hook, and a sensing contour on a rear end of the catch hook, the sensing contour rests under a spring force of the spring element on the control disc, and in response to a defined rotational speed of the drive shaft being exceeded, the sensing contour lifts from the control disc and the latch contour is lockingly engaged with a locking tooth among the locking teeth of the locking disc to hold the locking disc while the control disc continues to turn along a specified rotational path of the rotation limiter until the rotational path is exhausted and the locking disc and the control disc interlock, wherein the control disc actively pushes the catch hook into the locking tooth of the locking disc to obtain a locked position in which the control disc also prevents the catch hook from turning back so that the safety brake is locked, and the catch hook is trapped at both ends thereof such that the catch hook is caught at said both ends by the control cams and the locking tooth such that the control disc fits into a pocket of the catch hook.

14. The lifting gear according to claim 13, wherein the rotation limiter comprises:

at least one curved track, and a stopper displaceable along the at least one curved track.

15. The lifting gear according to claim 14, wherein the at least one curved track comprises a slot or a groove in the control disc.

16. The lifting gear according to claim 14, wherein the stopper is a pin.

17. The lifting gear according to claim 13, wherein the safety brake further comprises ratchet elements incorporated between the locking disc and the control disc.

18. The lifting gear according to claim 13, wherein the locking teeth are uniformly distributed on a circumference of the locking disc.

19. The lifting gear according to claim 13, wherein the control cams are uniformly distributed on a circumference of the control disc.

20. The lifting gear according to claim 13, wherein the control disc comprises a central support having an internal toothing, the locking disc is positioned on the central support and is secured in position by a securing element, in a starting position of the locking disc and the control disc, a rear external contour of each of the locking teeth is flush with an external contour of the control disc, the catch hook is supported on a side plate of the housing, the safety brake further comprises:

a release configured to reset the locking disc and the control disc to the starting position, and a return lock to prevent the relative rotation of the locking disc and the control disc in the starting position, the load chain wheel is configured to move a load chain, and the lifting gear is a lever hoist.

* * * * *